United States Patent [19]
Kravitz et al.

[11] Patent Number: 5,659,647
[45] Date of Patent: Aug. 19, 1997

[54] FIBER ALIGNMENT APPARATUS AND METHOD

[75] Inventors: Stanley H. Kravitz, Placitas; Mial Evans Warren, Albuquerque; Morris Burton Snipes, Jr., Albuquerque; Marcelino Guadalupe Armendariz, Albuquerque; James Cole Word, V., Albuqueruqe, all of N. Mex.

[73] Assignee: Sandia Corporation, Albuquerque, N. Mex.

[21] Appl. No.: 549,903

[22] Filed: Oct. 30, 1995

[51] Int. Cl.$^6$ ........................................ G02B 6/26
[52] U.S. Cl. .................. 385/52; 385/49; 385/88; 385/89; 385/92
[58] Field of Search .................... 385/14, 15, 49, 385/50, 52, 55, 56, 59, 76, 77, 88, 89, 92

[56] References Cited

U.S. PATENT DOCUMENTS

| | | | |
|---|---|---|---|
| 4,756,591 | 7/1988 | Fischer | 385/88 |
| 4,802,727 | 2/1989 | Stanley | 385/88 |
| 4,830,450 | 5/1989 | Connell | 350/96.2 |
| 4,862,272 | 8/1989 | Karlock | 358/181 |
| 5,125,054 | 6/1992 | Ackley et al. | 385/49 |
| 5,243,673 | 9/1993 | Johnson | 385/90 |
| 5,259,054 | 11/1993 | Benzoni et al. | 385/89 |
| 5,359,687 | 10/1994 | McFarland et al. | 385/49 |
| 5,394,495 | 2/1995 | Booth et al. | 385/59 |
| 5,416,872 | 5/1995 | Sizer, II et al. | 385/92 |

FOREIGN PATENT DOCUMENTS

| | | | |
|---|---|---|---|
| 1-204009 | 8/1989 | Japan | 385/89 X |
| 2219414 | 12/1989 | United Kingdom | 385/52 X |

OTHER PUBLICATIONS

Young, W.K. and Allen, M.G., "Surface Micromachined Platforms Using Electroplated Sacrificial Layers," *IEEE*, pp. 651–654.

Kravitz, S.H., Word, J.C., Bauer, T.M., Seigal, P.K. and Armendariz, M.G., "A Passive Micromachined Device for Alignment of Arrays of Single–Mode Fibers for Hermetic Photonic Packaging—The CLASP Concept," *IEEE CPMT Transactions Part B* (No date of publication).

Rogner, A., Ehrfeld, S., Munchmeyer, D., Bley, P., Burbaum, C. and Mohr, J. "LIGA based flexible microstructures for fiber–chip coupling," *IMM Institut fur Mikrotechnik GmbH* (Germany), pp. 167–170 (1991).

Frazier, A.B. and Allen, M.G., "High Aspect Ration Electroplated Microstructures Using A Photsensitive Polyimide Process," *Micro Electro Mechanical Systems '92 Travemunde* (Germany), Feb. 4–7, 1992.

*Primary Examiner*—Brian Healy
*Attorney, Agent, or Firm*—Kermit Lopez; George Libman

[57] ABSTRACT

A fiber alignment apparatus includes a micro-machined nickel spring that captures and locks arrays of single mode fibers into position. The design consists of a movable nickel leaf shaped spring and a fixed pocket where fibers are held. The fiber is slid between the spring and a fixed block, which tensions the spring. When the fiber reaches the pocket, it automatically falls into the pocket and is held by the pressure of the leaf spring.

15 Claims, 5 Drawing Sheets

FIBER ALIGNMENT APPARATUS AND METHOD

GOVERNMENT RIGHTS

The United States Government has rights in this invention pursuant to Contract No. DE-AC04-76DP00789 between the United States Department of Energy and Sandia Corporation.

FIELD OF THE INVENTION

The field of this invention relates to fiber alignment devices for use in fiber optic electronic packages. Cross reference is made to related patent application of Kravitz et at., Package for Integrated Optic Circuit and Method, Ser. No. 08/336,902 filed Nov. 10, 1994, pending.

BACKGROUND OF THE INVENTION

The field of fiber optics includes the technique of transmitting light through long, thin, flexible fibers of glass, plastic, or other transparent material. In the field of integrated fiber optics, the problem of precisely coupling fibers to integrated optical chips still demands a satisfying solution, especially with regard to long-term stability and economic aspects. Alignment of single-mode fibers to optic devices has proven to be the most expensive single item in the cost of packaged photonic devices, particularly where the desired packaged photonic device is hermetic. The present invention discloses a device and method which solves problems associated with the coupling of fibers to integrated optical chips.

Two prior art techniques attempt to solve these problems. The first technique involves coupling optical fibers to an optical chip by manual or semi-automatic adjustment, along with attaching the optical fibers to the optical chip with optical adhesives. The second technique involves prealigning optical fibers in an array. This optical fiber array can be constructed, for example, by anisotropically etching V-grooves in a silicon substrate, and adjusting and fixing the array to match the integrated optical component.

Nonetheless, both methods have severe disadvantages. Adhesives have thermal expansion coefficients far greater than that of optical chip and glass fibers. Also, at high temperatures, part of the adhesives may out-gas and damage the integrated optical circuit. With respect to the use of silicon V-groove arrays, there are also problems caused by thermal expansion. This is particularly true in the case of large arrays that have distances of several millimeters between the first and last fibers because the thermal expansion coefficient of silicon and optical chip materials like glass or $LiNbO_3$ are very different from one another. An additional problem associated with the use of silicon V-groove arrays is the high expenditure of time that results from these manual alignment techniques.

Devices are known for positioning optical fibers so that an axis of a fiber is positioned with respect to a reference axis. Representative of such devices is that shown in U.S. Pat. No. 4,756,591 (Fischer et al.), wherein a V-groove is formed in a silicon substrate and an elastomeric member is biased against the fiber to hold it in the groove. The groove may be stepped to provide a deeper groove segment to hold the jacket of the fiber within the device.

U.S. Pat. No. 4,756,591 (Sheem) discloses a grooved silicon substrate having a pair of intersecting V-grooves therein. A fiber to be positioned is disposed in one of the grooves while a shim is disposed in the other of the grooves. The shim may take the form of a tapered or an eccentric fiber, which when respectively slid or rotated under the first fiber serves to lift the same to bring the axis thereof into alignment with a reference axis. A cover may be positioned above the substrate to assist in clamping the first fiber into position.

U.S. Pat. No. 4,802,727 (Stanley) also discloses a positioning arrangement for optical components and waveguides which utilizes a V-grooved structure. U.S. Pat. No. 4,862,272 (Pimpinella et at.) and U.S. Pat. No. 4,830,450 (Connell et al.) discloses arrangements for positioning an optical fiber that utilize members having frustoconical apertures therethrough.

Optical fibers generally include an inner core with a predetermined index of refraction. This inner core is surrounded by a cladding layer. The cladding layer has an index of refraction lower than that of the inner core. The inner core is the medium in which the optical energy is guided, while the cladding layer defines the index boundary with the core. The outer diameter of the fiber may vary in dimension about a predetermined nominal dimension. It has been seen, for example, that two nominally identical fibers from the same manufacturer may vary in outside diametrical dimension by as much as +4 µm to −4 µm. This fiber to fiber variation in outer diameter makes difficult the accurate positioning of the axis of the core of a fiber with respect to a predetermined reference axis using a positioning apparatus having a V-grooved structure.

Other methods in the prior art for positioning fibers include that disclosed in U.S. Pat. No. 5,243,673 (Johnson et al.) which describes a positioning apparatus that aligns a predetermined point on an optical fiber with a reference axis. Johnson et al shows an opto-electronic component having a positioned optical fiber associated therewith. Johnson includes an opto-electronic device of either an edge or surface active type mounted on a pedestal.

The structure and method disclosed according to the present invention is different from the foregoing references and other devices and techniques in the prior art, and offers many advantages over the prior art. An advantage of the present invention is that it discloses a Z-axis approach, unlike Johnson or the aforementioned prior art. In a z-axis approach, fibers are brought in normal to the surface, whereas with the aforementioned prior art, including Johnson, the fibers are positioned parallel to the surface. As a result, the prior art utilizes an approach involving butt-coupling for optical devices, or a turning-mirror at the end of a channel to re-direct light up or down. The aforementioned prior art patents also utilize V-grooves which slide the fiber along, effectively tapering the fiber and placing pressure on the sides of the fiber. Another advantage of the present invention is that it may be entirely independent of lenses. Still another advantage of the present invention is that it employs a device and concept for capturing fibers that may be applied to lasers, detectors, gratings, or other optical output or input devices, which affords a wide range of practical applications in the area of fiber alignment for opto-electronic devices.

SUMMARY OF THE INVENTION

The present invention relates to a fiber alignment apparatus for the alignment of an array of optical fibers. The present invention further provides a method of passive mechanical alignment of an array of single mode fibers. The fiber alignment apparatus may include micro-machined springs that capture and lock arrays of single mode fibers into position. The springs may be fabricated from electroplated nickel, using photodefined polyimide as a plating mask. The fibers are typically binary optical ones of the type utilized in packaged photonic devices.

The design of the present invention consists of a movable leaf shaped spring and a fixed pocket for holding a fiber. The fiber slides between the leaf shaped spring and a fixed guide block. Together, the leaf shaped spring and the fixed block provide tensioning for a fiber. When the fiber meets the pocket it is held in place in the pocket by pressure from the leaf spring. The fibers are pre-positioned in a separate silicon block. This separate silicon block is laser drilled to accept optical fibers.

The passive mechanical fiber alignment apparatus and method of the present invention utilizes a micro-machined metal spring for capturing a vertical prepositioned fiber, and moving the fiber into accurate alignment, effectively holding it for attachment. The springs may be fabricated from electroplated nickel, using photodefined polyimide as a plating mask. The springs are aligned with binary optics on the back side of a substrate. This entire concept is referred to as "Capture and Locking Alignment Spring Positioner" (hereinafter referred to by the acronym "CLASP"). The springs can be used for general alignment and capture of any fiber utilized in optical input or output devices.

DETAILED DESCRIPTION OF THE INVENTION

Figure 1:
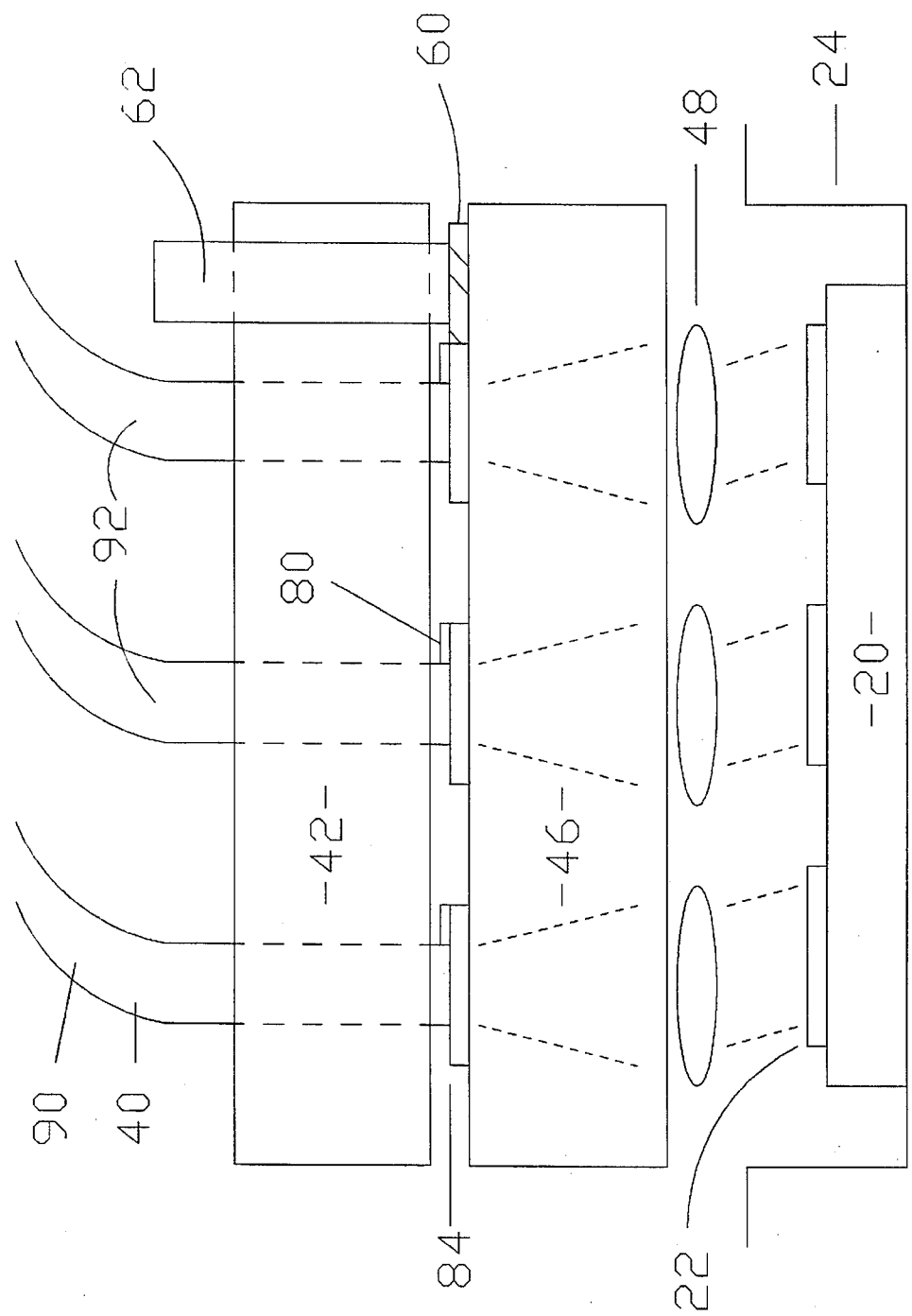
FIG. 1 illustrates a schematic for a hermetic optical package, showing a fiber alignment and capture device.

FIG. 1 shows a schematic diagram of one embodiment of the present invention. This embodiment presents a hermetic optical package with a fiber alignment and capture device including fibers 40, fiber holding block 42, and binary element device 46, where fibers 40 consist of input fibers 90 and output fibers 92. One end of each fiber 40 extends through block 42 and is held in position a predetermined distance from a desired focal point on a surface of device 46 by a CLASP consisting of guide block 84 and spring 80 mounted on the device surface. In this embodiment, light communicating with fibers 40 travels through device 46 to lenses 48 on the opposite surface of device 46 from the CLASPs. From lenses 48, the light may communicate with an optical device 20 having gratings 22 and package walls 24.

The function of fiber holding block 42 is to pre-position fibers 40 for subsequent alignment with binary element device 46. The spacing and positioning of block 42 with respect to device 46 is controlled by alignment pins 62. Block 42 is separated from and located adjacent to device 46 across gap 96. Fibers 40 are positioned normal to fiber holding block 42 and fit within etched or laser drilled holes 44 inside fiber holding block 42, as discussed hereinafter. Alignment pins 62 also fit within etched or laser drilled holes 58 in fiber holding block 42.

Fibers 40 are preferably optical fibers, long, thin threads of fused silica, or other transparent substances, used to transmit light. To allow light to pass from focal points 32 of fibers 40 to lenses 48, binary element device 46 may be comprised of a material such as a silicon wafer or other material suitable for patterning and etching features which transmits light signals and may also be utilized as a substrate upon which the CLASP features may be patterned and subsequently etched. Other than the CLASP on the surface of device 46, details of device 46 are not part of this invention. Additional information on device 46 may be found in the related Kravitz et at. patent application cited above.

Although binary lenses 48 and optical device 20 are shown in the embodiment of FIG. 1, the CLASP is independent of lenses 48 and the structure of device 20. The CLASP can be used to capture fibers and align them to lasers, detectors, grating or other optical output or input devices.

Figures 2A, 2B:
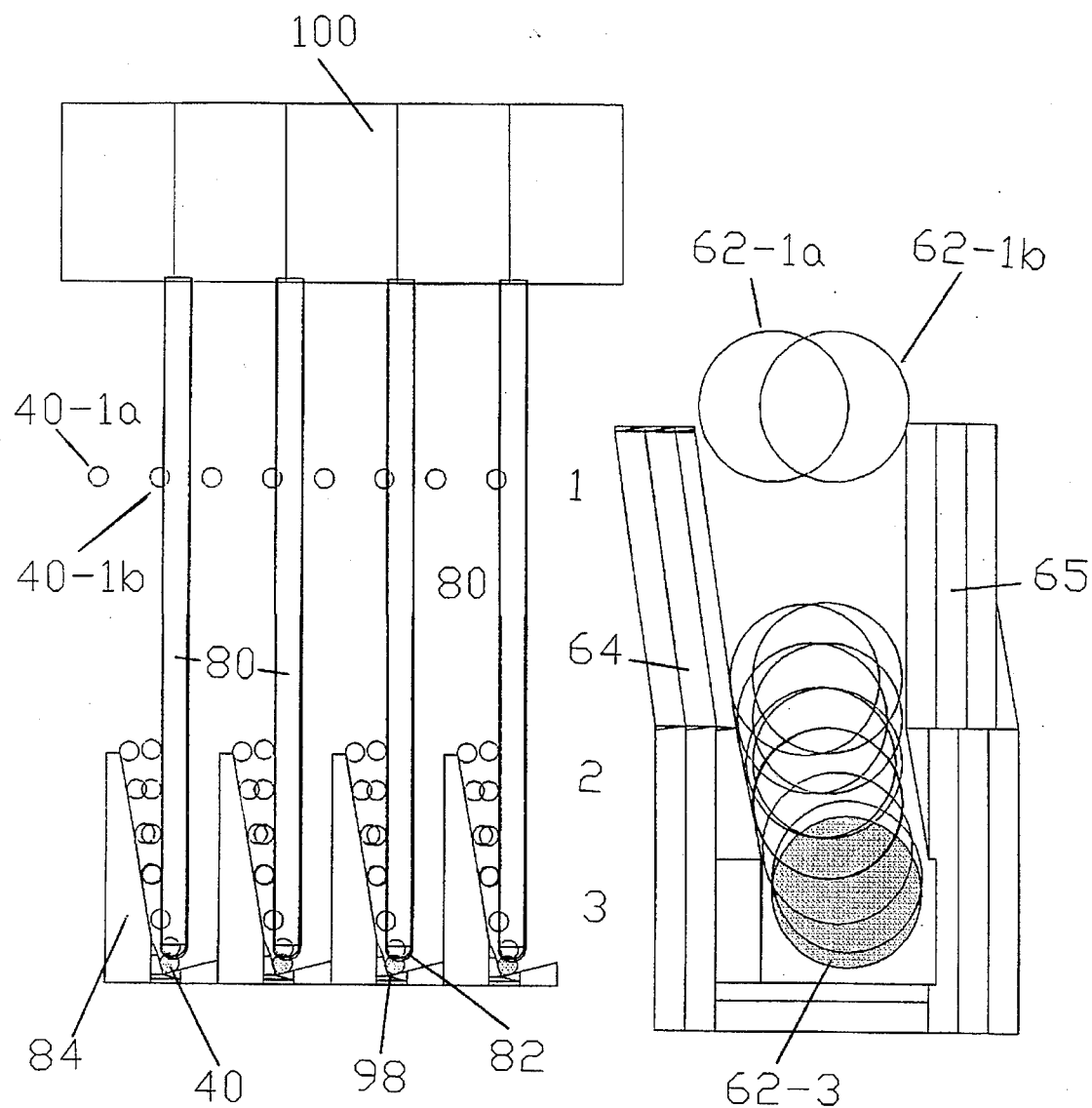
FIG. 2a and FIG. 2b illustrates a linear four pocket spring design with springs, an alignment pin and the movement of fibers and an alignment pin.
Figure 3:
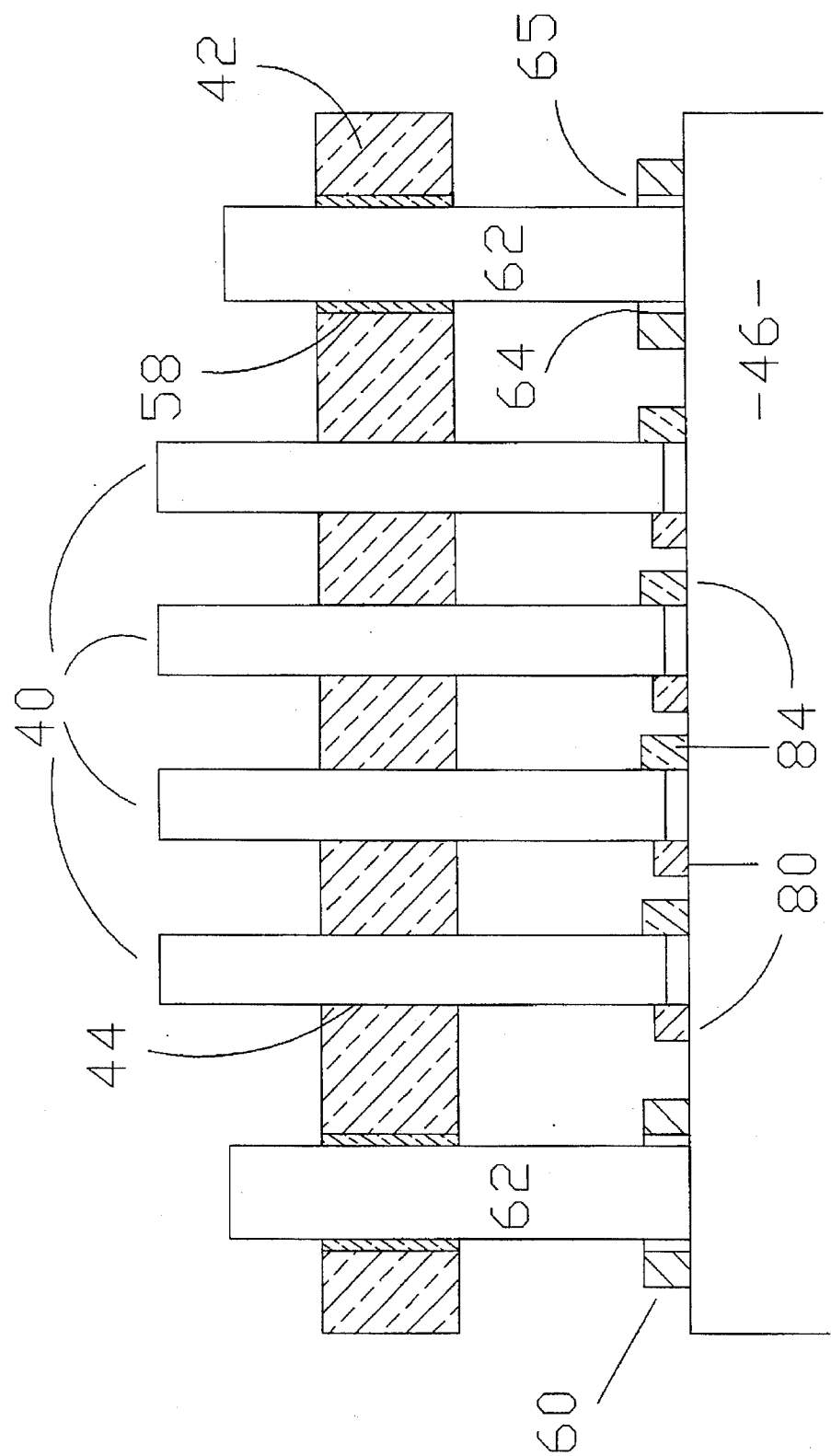
FIG. 3 shows a view of four fibers, a fiber holding block, a binary element device and two alignment pins.

FIGS. 2a, FIG. 2b and 3 show four fibers 40 held in place by four respective springs 80 positioned on binary element device 46. Each spring 80 functions to press the side of a fiber 40 firmly and solidly in place against a guide block 84. Spring 80 is preferably a leaf spring and derived from deposited nickel and includes a cantilevered free end 82 and a base or thicker end 100 that does not move relative to block 46. Guide block 84 is located near, but spaced from, spring 80, with facing sides of guide block 84 and spring 80 defining a funnel area 88 for controlling the movement of a fiber 40. Pocket 98 is formed at the narrow end of funnel 88 along one portion of guide block 84 adjacent end 82 of spring 80 for holding fiber 40 at a desired location. End 82 of spring 80 moves parallel to the surface of device 46 in the x-direction as shown in FIG. 2 and biases fiber 40 against pocket 98. Four alignment pins 62 (two of which are shown in FIG. 3) extend through holes 58 in fiber holding block 42, and abut stop 60 to position fibers 40 at the predetermined distance above the surface of device 46 so that a capture procedure may begin.

In this embodiment fibers 40 extend from block 42 a first distance and pins 62 extend an additional second distance equal to the desired gap between the ends of fibers 40 and the surface of device 46. This gap is important, because the fibers will be optically degraded if their ends slide in contact with device 46. Stop 60 has sidewalls 64 and 65 for keeping pin 62 in a desired position. FIG. 3 views stop 60 from the wide end of the V formed by sidewalls 64 and 65. In operation, as block 42 is moved causing pin 62 to slide to the narrow end of the V (into FIG. 3), fibers 40 slide into pockets 98 as described hereinafter.

In operation, block 42 is moved by conventional means such as a robotic machine toward device 46 from the z-direction normal to the x-y plane. The subsequent movement of alignment pin 62 and fibers 40 are shown in FIG. 2 at several positions indicated as 1–3 as block 42 slides pin 62 and fiber 40 toward a final position. When pin 62 is at an initial position 62-1a against side 64 of stop 60, fiber 40 is at position 40-1a. Alternatively, if pin 62 were at an initial position 62-1b against side 65, then fiber 40 would rest against spring 80 at position 40-1b. For either initial position, as stop 60 guides pin 62 towards a final position 62-3, fiber 40 is seen to slide down funnel 88 until it deflects spring 80 and is held in pocket 98 by tip 82. Since fibers 40 are not strong enough to bear any weight alone, after fibers 40 are aligned and captured in pockets 98, alignment pins 62 support the weight of block 42. Alignment pins 62 also may act as surfaces for adhesive joining between alignment pins 62 and stops 60.

Figure 4A:
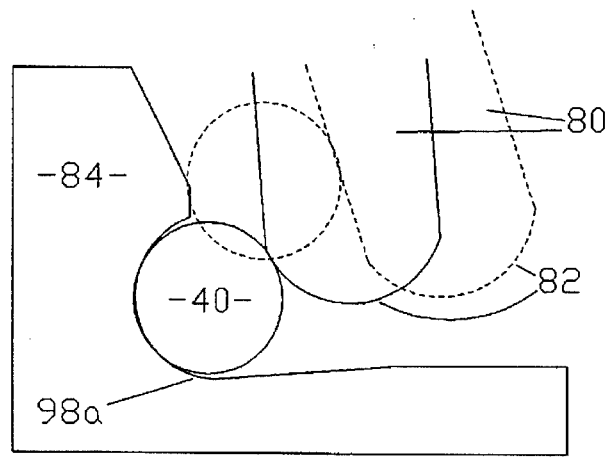
FIG. 4(a) shows a round-pocket design.
Figure 4B:
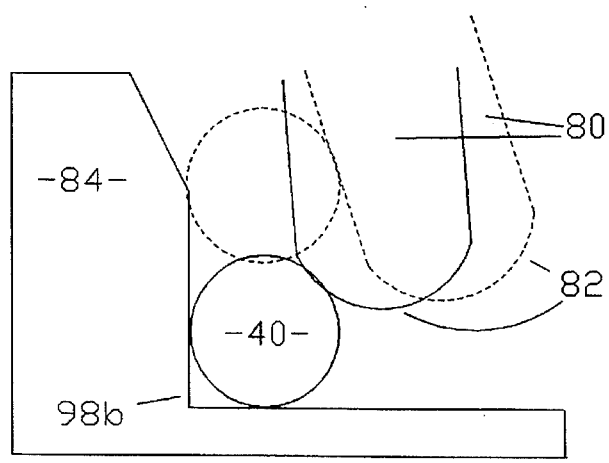
FIG. 4(b) shows a square-pocket design.
Figure 4C:
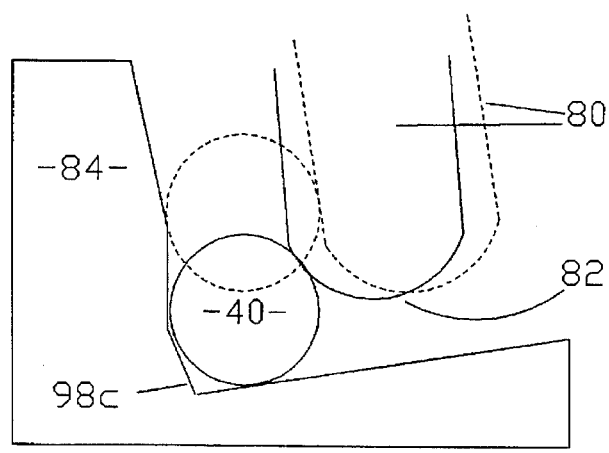
FIG. 4(c) shows a V-pocket design.

The elastic limits of spring 80 are important for tensioning the spring 80. As shown in FIGS. 4a–4c, as fiber 40 proceeds toward pocket 98, spring 80 is gradually tensioned. Spring 80 reaches maximum tension when fiber 40 passes the location where the distance between spring 80 (when no fiber is present) and block 84 is smallest, as indicated by the dotted outline in FIGS. 4a–4c; immediately prior to fiber 40 entering capture pocket 98. When fiber 40 is in pocket 98, this tension is reduced. Spring 80 must not be tensioned so greatly as to deform during this capture operation, otherwise locking will not properly occur.

The design of capture pocket 98 controls the way in which fiber 40 enters pocket 98. Round pockets are shown in the embodiment of FIG. 4(a), along with end 82 of the spring 80 and a cross-sectional view of fiber 40. Other pocket designs may include a square-shaped pocket as shown in FIG. 4(b), or a V-shaped pocket as shown in FIG. 4(c). Both the square-shaped and V-shaped pocket designs are easier to pattern and etch than the round shaped pocket design. However, the round pocket design allows for greater accuracy in fiber 40 placement within pocket 98. The V-shaped pockets of 4(c) allow for a greater fiber size because a larger fiber may sit at various positions with a V-shaped pocket depending on the size of fiber 40. A fiber 40 utilized with a round shaped pocket design must conform to the round pocket and is thus limited in its placement by its size or thickness.

The spacing of springs 80 is limited by the diameters of fibers 40. An arrangement of springs 80 spaced as little as 50 μm more than the diameter of fibers 40 may be utilized to increase packing density in a fiber optic package. An array of four single-mode 125 μm fibers 40 may be positioned in a linear arrangement. As shown in FIG. 2, the cores of fibers 40 are set 750 μm apart from each other and the length of spring 80 is 4 mm.

It is not necessary to limit the present invention by the number of fibers 40 in an array of fibers. An embodiment of the present invention may include many fibers 40. The size of fiber 40 is also not a necessary limitation of the present invention. Fibers 40 of varying diameters and sizes may be utilized in a single fiber optic package. Further multimode fibers may be utilized instead of single mode fibers.

Rough positioning of fibers 40 in fiber holding block 42 shown in FIGS. 1 and 3 requires drilling holes 44 and holes 58 in a block 42 of silicon or other similar substrate material. Holes 44 and holes 58 should be smooth, free of debris, perpendicular to block 42, at a correct step distance, and approximately 2 μm larger than optical fibers 40. This preferred clearance of 2 μm allows a fiber 40 to fit properly within a hole 44. A larger clearance for hole 58 may be appropriate for an alignment pin 62 depending upon the size and diameter of alignment pin 62. An excimer laser may be utilized to drill holes 44 and holes 58. Thus, in an embodiment of the present invention an excimer laser may ablate hole 44, allowing for a hole 44 diameter of approximately 127 μm and the production of holes 44 perpendicular to block 42. An excimer laser may also be utilized to ablate holes 58, albeit with different measurements than holes 44, as coarse alignment pins 62 have an approximate 1 mm diameter.

To position fibers 40 in block 42, pins 62 protrude about 2 mm from block 42 and are rested against a surface straddling a spacer having a thickness of the predetermined distance (e.g. 5 microns). Fibers 40 are inserted in block 42 and pushed against the aforementioned spacer.

Fabrication of the present invention includes a process that follows three basic steps. These steps include: (1) patterning; (2) electroplating; and (3) freeing the moving parts from the substrate.

Figure 5:
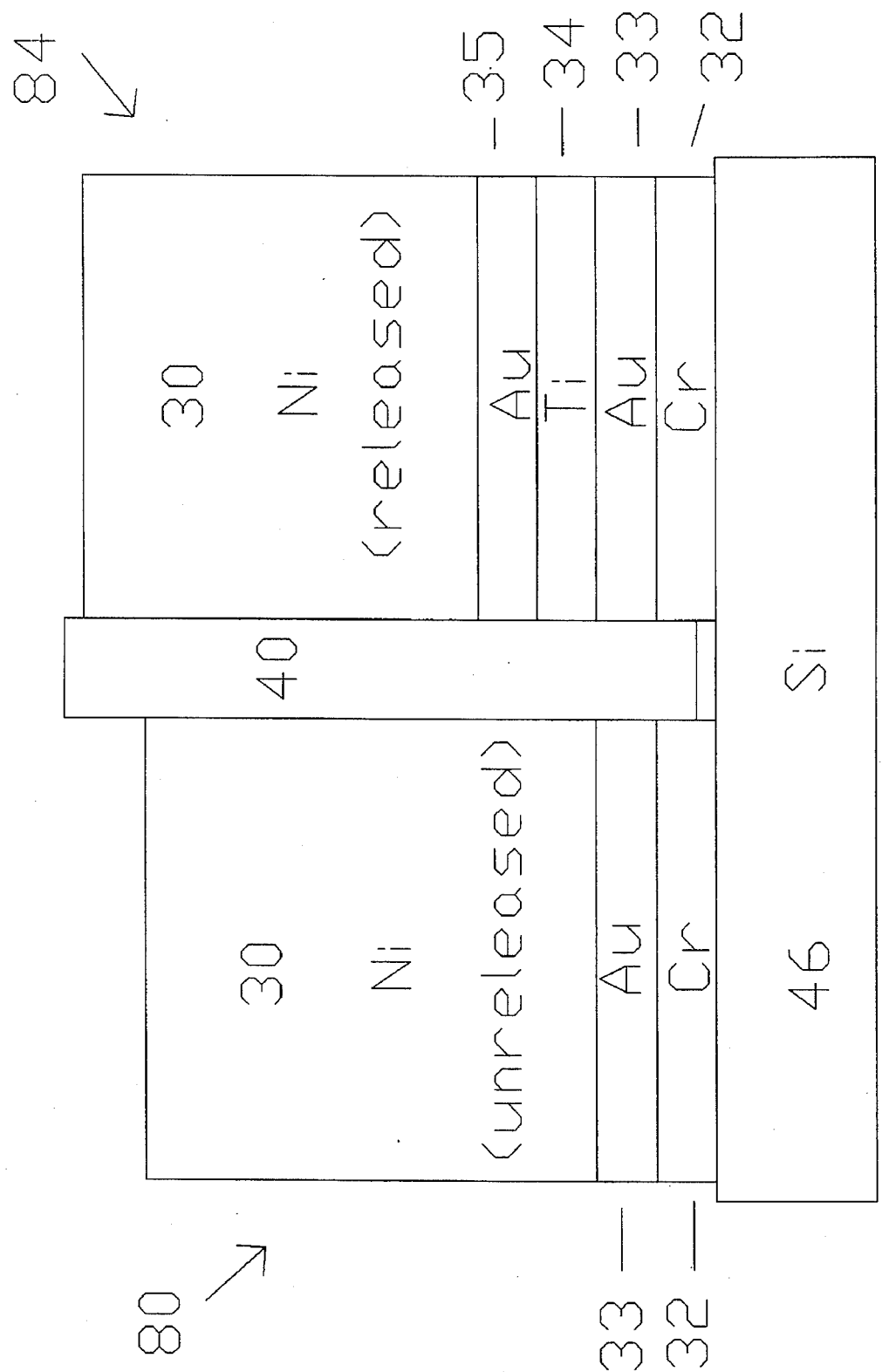
FIG. 5 shows the layers of the invention.

FIG. 5 is a cross section of block 84 and spring 80 that shows how they are constructed. An undoped silicon wafer 250 μm thick may be utilized as a substrate for device 46. In this embodiment the wafer must remain undoped so that there is maximum transmission at 1300 nm. A 40 to 100 nm thick seed layer of chromium 32 and gold 33 is deposited on the silicon wafer substrate. For only the portions of spring 80 that are to move relative to substrate 46, a release layer of titanium 34 and gold 35 is evaporated with layer thicknesses of 50 nm and 100 nm respectively, and patterned to the shape of the movable springs. Photodefinable polyimide (e.g. DuPont 2721) is spun on using multiple coats with 105° C. bakes after each coat. A total polyimide thickness may be 85 μm. The polyimide is exposed with an MJB3 (Suss) contact printer. After spray development and an oxygen plasma descum, the pattern is then electroplated in Lectro-Nic plating solution from Ethone-Omi Corporation to form an 80 μm thick nickel layer 30. The polyimide is then removed with n-methyl pyrolidone, followed by an oxygen plasma descum. The unplated gold is removed by argon sputter; and the release layer 34 of titanium under spring 80 is removed with a buffered oxide etch. The spring 80 is connected to an immobile base 100 constructed in the same manner as block 84. Base 100 is patterned and etched with spring 80 in this manufacturing process.

After fiber holding block 42 and binary element device 46 have been fabricated, the two blocks are positioned and joined as discussed above. The method used for alignment involves moving the block holding pre-positioned fibers 40 (which have been adjusted to equal lengths), against binary element device 46. This movement allows the flexible, individual fibers 40 to lock into place in their respective micromachined springs 80. Since springs 80 have been previously aligned to binary optics residing on the back of the substrate, a total alignment of fiber to binary optics may now be accomplished.

To confirm that fibers 40 have been accurately positioned, an embodiment of the present invention may include a method for observing the alignment and capture as well as to measure the accuracy of fiber core placement. An infra-red camera may be positioned on the backside of binary element device 46. A 1300 nm laser may illuminate the backside of fiber holding block 42. Since silicon or similar material is transparent to 1300 nm radiation, an image which shows nickel features in silhouette may form on the backside of fiber holding block 42 following such illumination. If 1300 nm light is also sent through the single-mode fibers, then the cores of the fibers may be brightly illuminated to reveal features for measurement.

Accurate measurements of the distance between illuminated optical fiber cores may be made by utilizing an optical microscope, an infra-red sensitive camera, and precision stepping motors. This technique further involves measuring the distance between optical fiber cores at a high magnification. The microscope cross-hair may be positioned on the first of four fiber cores that have been aligned by the fiber alignment apparatus and method of the present invention. The point determined by the microscope cross-hair may serve as a zero reference. The stepping motors of the optical microscope may then move the cross-hair for alignment with the next core. This measurement is repeated for all cores.

A new concept for aligning and capturing single mode fibers has been shown. This concept may be referred to by the acronym CLASP. Accurate alignment of four-fiber arrays has been demonstrated by the present invention. The fiber alignment apparatus set forth in the foregoing description and accompanying drawings is offered by way of illustration only and not as a limitation. Other applications and variations of the fiber alignment apparatus and method will become evident to those skilled in the art. For example, multiple arrays of fibers may aligned by the apparatus and method of the present invention. In addition, the rapid alignment of optical fibers and the like may be accomplished by robotics handling the device of this invention. The actual scope of the invention is intended to be defined in the following claims when reviewed in their proper perspective based on the prior art.

We claim:

1. An apparatus for aligning a free end of a fiber to a predetermined location on a surface comprising:

a guide block having a side extending approximately perpendicular from said surface, said side being fixed in position relative to said surface and having a portion forming a capture pocket at the predetermined location;

spring means for biasing a free end of a fiber against said capture pocket.

2. The apparatus of claim 1 further including means for holding the end of said fiber a predetermined distance from said surface.

3. The apparatus of claim 2 wherein said means for holding comprises:

fiber holding block means for holding said fiber substantially perpendicular to said surface, an end of said fiber extending a first distance past said block means towards said surface;

alignment means for maintaining said block a second distance from said surface, wherein the second distance is greater than the first distance by the predetermined distance.

4. The apparatus of claim 3 wherein said alignment means comprises:

a support extending the second distance from said block means toward said surface.

5. The apparatus of claim 2 wherein said guide block is formed on said surface.

6. The apparatus of claim 1 wherein said spring is a leaf spring and wherein said spring has a free end adjacent said pocket and an arm connected to a fixed end.

7. The apparatus of claim 6 wherein a distance from the side of the guide block to the arm is greater than near the fixed end of the spring than near the free end of the spring.

8. The apparatus of claim 7 wherein an area between the guide block and the free end of the spring defines a funnel area, said pocket being at a narrow end of the funnel area.

9. The apparatus of claim 3 wherein the alignment means further comprises at least one alignment pin.

10. The apparatus of claim 1 wherein said capture pocket is V-shaped.

11. The apparatus of claim 1 wherein said capture pocket is square shaped.

12. The apparatus of claim 1 wherein said capture pocket is round shaped.

13. The apparatus of claim 9 wherein said alignment means further comprises a pin guiding structure having spaced walls which define an area for receiving a pin.

14. The apparatus of claim 13 wherein said pin guiding structure further comprises a narrow end and a wide end of said area.

15. The apparatus of claim 14 wherein when said pin is positioned within the narrow end of said area, a fiber is locked in said pocket.

* * * * *